(12) United States Patent
Jensen et al.

(10) Patent No.: US 6,732,635 B2
(45) Date of Patent: May 11, 2004

(54) COFFEE POT

(75) Inventors: Claus Jensen, København (DK); Henrik Peter Holbaek, København (DK)

(73) Assignee: Eva Denmark A/S, Rodovre (DK)

( * ) Notice: Subject to any disclaimer, the term of this patent is extended or adjusted under 35 U.S.C. 154(b) by 41 days.

(21) Appl. No.: 10/143,550

(22) Filed: May 10, 2002

(65) Prior Publication Data

US 2002/0166453 A1 Nov. 14, 2002

(30) Foreign Application Priority Data

May 14, 2001 (DK) .......................... 2001 00750

(51) Int. Cl.$^7$ .......................... B01D 35/00; A47J 31/00
(52) U.S. Cl. .......................... 99/322; 99/279; 99/323.3; 210/469; 210/477
(58) Field of Search ............... 99/279, 323.3, 99/322, 321, 304, 287; 210/469, 464, 474, 477, 495, 244

(56) References Cited

U.S. PATENT DOCUMENTS 1,041,378 A * 10/1912 Tweeddale .................. 210/464
1,468,411 A * 9/1923 Ong .......................... 210/469
2,686,597 A * 8/1954 Lilja
4,721,835 A * 1/1988 Welker .................. 99/323.3 X
5,947,004 A    9/1999 Huang

FOREIGN PATENT DOCUMENTS

| DE | 3740397 C1 | 8/1989 |
| DK | 2000 00299 U3 | 12/2000 |
| EP | 0072434 A1 | 2/1983 |
| FR | 1 459 261 A | 4/1966 |
| WO | 2 321 175 A | 7/1998 |

* cited by examiner

Primary Examiner—Reginald L. Alexander
(74) Attorney, Agent, or Firm—William J. Sapone; Coleman Sudol Sapone, P.C.

(57) ABSTRACT

A coffee pot has a strainer (3) in the form of a bag which extends down into the pot (1). Ground coffee (6) is first poured into the pot (1), and then hot water (5) is filled into the pot, causing the coffee (6) to be stirred up and to be mixed with the water, so that the coffee extraction takes place in a gentle and effective manner. Over time, the ground coffee (6) quietly precipitates on the bottom of the pot. When the coffee is poured out of the pot, the coffee grounds (6) are retained in the pot by the strainer element (3).

2 Claims, 2 Drawing Sheets

COFFEE POT

The invention relates to a coffee pot in the form of a container having a neck and a discharge spout, said pot being provided with a strainer element which retains the ground coffee in the pot when the coffee is poured out of the pot.

Coffee pots of this type are known from EP 0 072 434 A1. The pot is provided with a screw lid having a pouring spout and a filter element. When the pot is to be used, the lid is screwed off, and then the pot is filled with ground coffee and hot water. The lid is then screwed on to the pot again, following which coffee may be poured out after a suitable period of infusion, the ground coffee, the coffee grounds, being retained by the filter element in the lid.

This structure, however, is vitiated by several drawbacks. First and foremost, the lid is constructed to be screwed off and on to the pot, which means that the filter has to be arranged at the top of the lid. This involves the risk that the coffee runs unevenly out of the pouring spout, just as there is a risk that the coffee grounds will block the outlet. The reason is that the filter area corresponds to the internal flow opening of the pot, which results in a limited area.

OBJECT OF THE INVENTION

The object of the invention is to remedy these drawbacks of known pots, and this is achieved according to the invention by constructing the filter element, the strainer, as a net bag.

Hereby, the strainer surface becomes so large that there will be no risk of blocking of the outflow from the pot. Furthermore, the strainer is arranged down in the pot, and the coffee will therefore run out in an even flow, since the discharge spout will direct the coffee flow directly to the discharge spout. As a result, an even outflow of coffee will be achieved.

When, the net bag is made of a metal gauze, a sturdy strainer is achieved, and moreover cleaning by flushing after use is facilitated.

When, the bag is secured to a ring that sealingly engages the neck of the pot, both the shape and the position of the strainer element are ensured.

Finally, it is expedient, to construct the ring with an elastic gasket on the outer side, since it may then be easily removed and applied, in liquid-tight engagement with the neck of the pot.

BRIEF DESCRIPTION OF THE DRAWINGS

The invention will be described more fully below with reference to the drawing, in which.

DETAILED DESCRIPTION OF THE INVENTION

Figure 1:
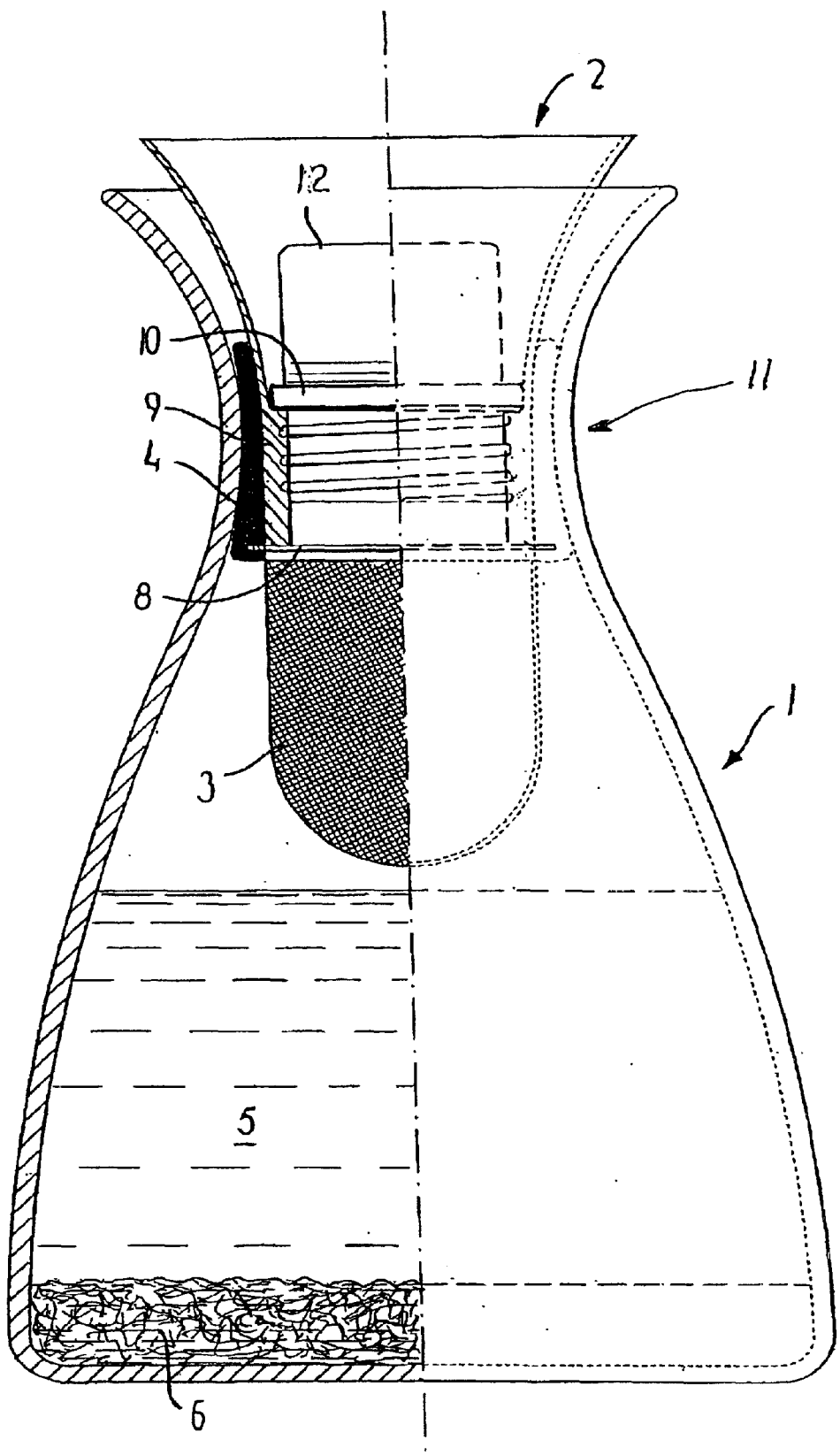
FIG. 1 shows a partial cross-section through the coffee pot after brewing.

The drawing shows an example of a pot 1 which is constructed as a container which is narrowed at the top to form a neck 11, and which is provided with a closing plug 10.

This pot 1, 11 may be formed with insulating walls to enable it to keep in the heat/cold.

The container neck 11 internally mounts a unit comprising a pouring spout 2, a screw plug 10 and a strainer element 3.

These parts constitute a unit which is dimensioned such that the unit may be secured releasably in the neck 11 of the pot 1.

This is achieved by means of a more or less elastic gasket 4 which extends externally on the unit, and which engages the neck in a liquid-tight manner.

The unit moreover comprises a ring-shaped part 9 which externally carries the gasket 4, and which is internally formed with threads in which a screw plug 10 may open and close the passage of liquid in a generally known manner.

The plug 10 is provided with a gripping part 12 at the top such that the plug may be opened and closed by rotation.

Figure 2:
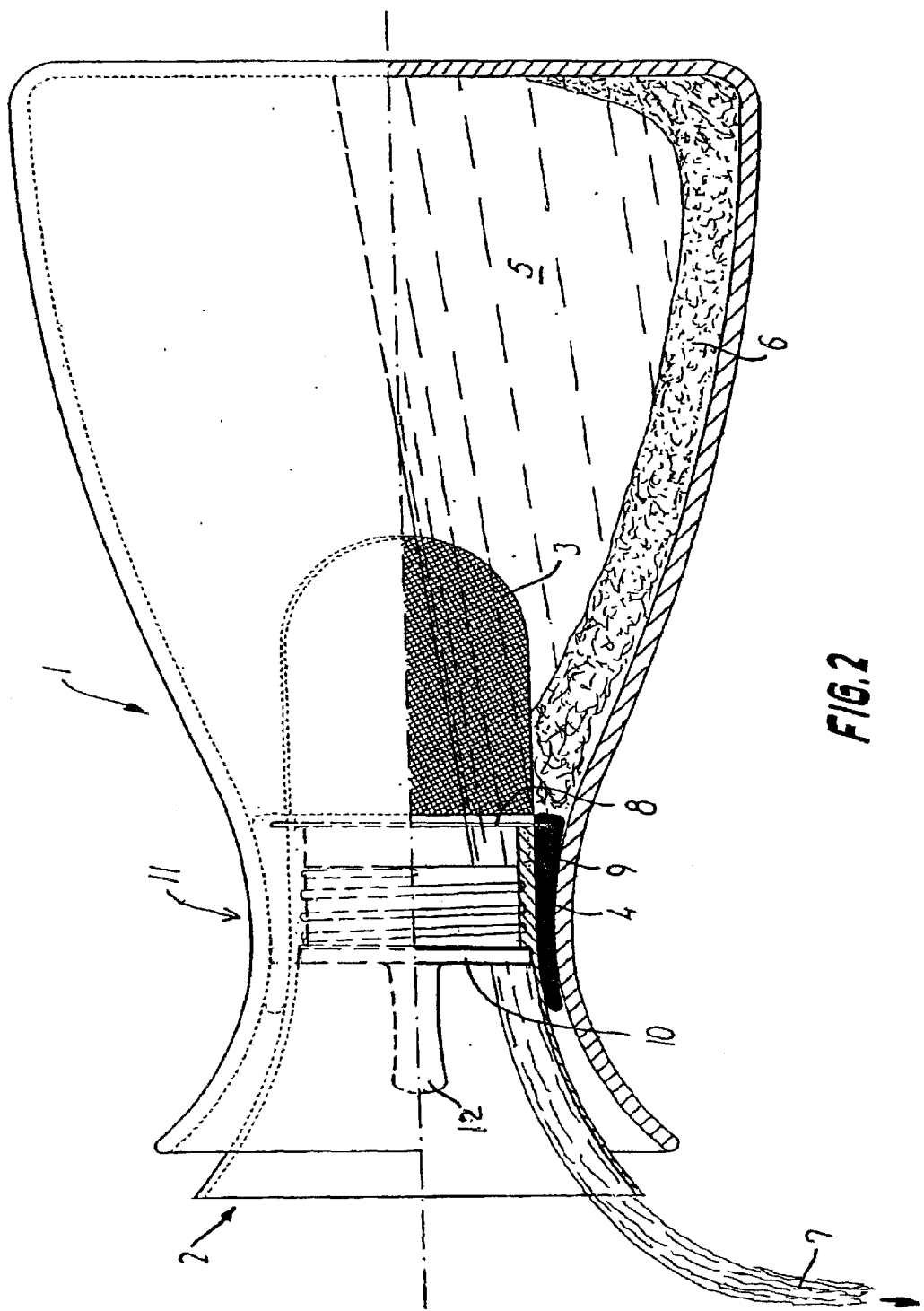
FIG. 2 shows the coffee pot when pouring.

The ring-shaped element 9 is configured as a pouring spout 2 at the top, as is indicated in FIG. 2, from which the flow of liquid appears.

A strainer part 3 is secured on the lower part 8 of the ring 9, as shown. This strainer part is preferably made of a metal gauze, which is both sturdy and easy to clean by flushing. However, nothing prevents the strainer element from being made of other materials, such as plastics.

The use of the pot will now be described.

The pouring spot with the strainer element is first removed from the pot.

The desired amount of ground coffee 6 is then introduced, and a suitable volume of hot water is subsequently filled into the pot.

The plug unit is applied as shown in FIG. 1, following which the plug is applied as shown in FIG. 1.

The ground coffee 6 will be stirred up when the water is supplied, but will gradually settle, but not as a compact layer, but rather as more or less "floating" dregs.

The flavours are hereby extracted in an extremely gentle way and completely without the bitter substances that give the unpleasant taste of stale coffee.

When coffee 5 is to be poured out of the pot, the plug 10 is loosened, and pouring takes place as shown in FIG. 2.

The coffee 7 now runs through the spout 2, while the ground coffee is retained by the strainer element 3 as coffee grounds 6.

It should be noted that the strainer element 3 has such a size and thereby surface that the grounds 6 will not block the flow through the strainer element.

When the pot is empty, the plug unit with the strainer element 3 may be removed from the pot, and both the pot and the strainer element may easily be emptied of coffee grounds and then be flushed entirely clean.

In this described example, the strainer element 3 is secured by a ring 9 which constitutes the exterior of a screw plug with pouring spout. Of course, nothing prevents the closing device from being formed by a tilting lid or the like, when only the strainer element 3 can be secured to the pot so that the coffee 5 passes through the strainer when the coffee is poured out of the pot.

Coffee may be brewed both rapidly and easily in this simple manner, and the coffee may be poured without any risk of pulsation, since the coffee grounds on the strainer do not block either entirely or partly and thereby interfere with the pouring of coffee.

What is claimed is:

1. A coffee pot comprising a container having a neck and a discharge spout, said pot being provided with a strainer element which retains ground coffee in the pot when coffee is poured out of the pot, the strainer element consisting of a net bag which protrudes a distance down into the pot, the net bag secured to a ring engaged to the neck of the pot in a liquid tight manner, the net bag having an elastic gasket on an outer side so that the ring is removably engaged to the pot.

2. A coffee pot comprising a container having a neck and a discharge spout, said pot being provided with a strainer element which retains ground coffee in the pot when coffee is poured out of the pot, the strainer element consisting of a net bag which protrudes a distance down into the pot, the net bag secured to a ring engaged to the neck of the pot in a liquid tight manner, the net bag having an elastic gasket on an outer side so that the ring is removably engaged to the pot, the net bag made of metal gauze.

* * * * *